Aug. 25, 1959 R. PLUNKETT 2,901,703
FRICTIONLESS SUSPENSION MEANS FOR ROTARY ELEMENTS
Filed Feb. 19, 1957
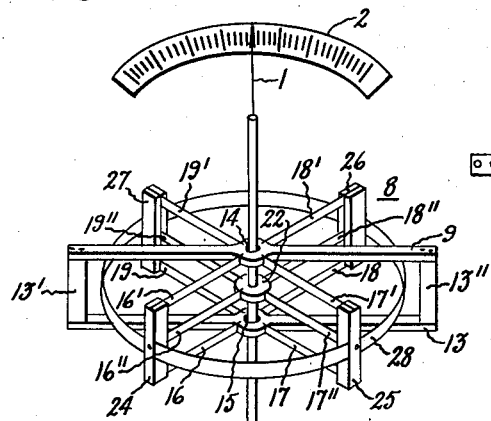
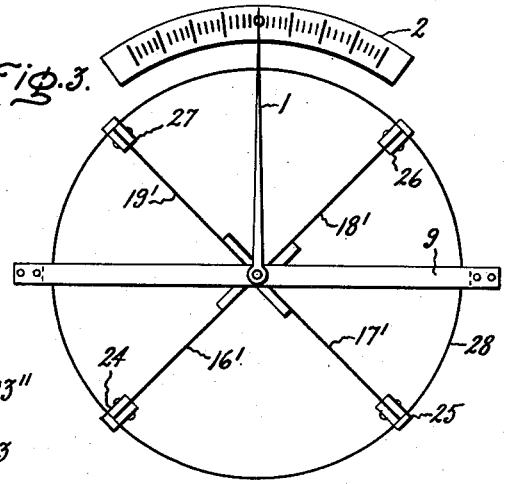
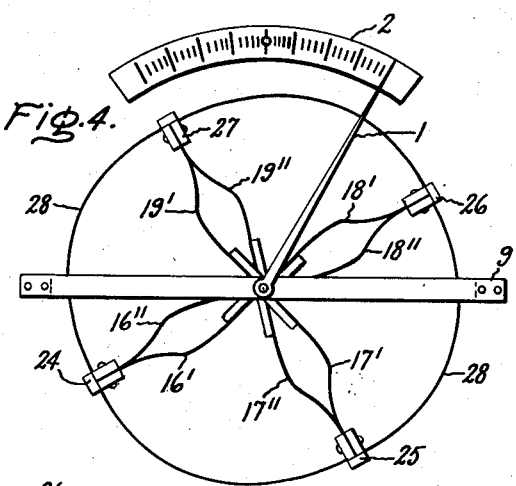
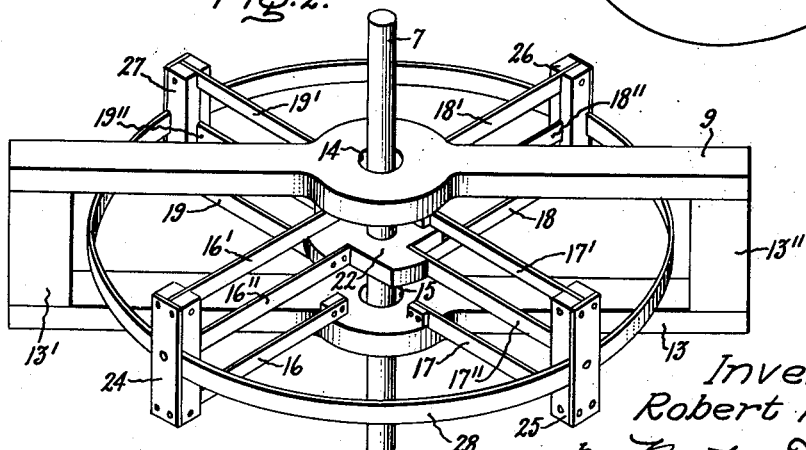
Inventor
Robert Plunkett
by Merton D. Morse
His Attorney

United States Patent Office 2,901,703
Patented Aug. 25, 1959

2,901,703

FRICTIONLESS SUSPENSION MEANS FOR ROTARY ELEMENTS

Robert Plunkett, Schenectady, N.Y., assignor to General Electric Company, a corporation of New York Application February 19, 1957, Serial No. 641,099

8 Claims. (Cl. 324—155)

My invention relates to frictionless suspension means for rotary reciprocating elements of delicate instruments. It has for one of its objects to provide an improved frictionless suspension means providing both support and frictionless rotation of such elements in either direction from a normal position in rotation.

Frictionless suspension means have been provided in the past, such as that illustrated in United States Patent No. 1,983,305 to Josua G. Paulin, or that illustrated and described by W. E. Young in the Journal of Applied Mechanics for June 1944, pages A113 to A120, but certain difficulties are present in prior constructions, such as undesired vibration axially of the axis about which the movable element rotates and laterally of that axis. In addition, undesired lateral movement of that axis itself upon deflection of the instrument index may occur.

An object of my invention is to provide such a suspension which resists vibration both in the direction of the axis of rotation and laterally thereof.

Still a further object of my invention is to provide such a suspension in which the pivoted member remains accurately centered during rotation thereof.

A further object of my invention is to provide a spring suspension suitable for mounting the reciprocating element of delicate instruments and in which the axis of rotation is maintained fixed during rotation of the suspended element and which, at the same time, resists vibration both axially of said axis and laterally thereof.

In accord with my invention, the rotary element to be suspended is provided with radially extending springs. The instrument support or frame is, likewise, provided with springs also extending from fixed points adjacent to the axis of the pivoted element radially with respect to the pivoted element and in the same plane as said first springs. These springs in any radial plane are connected together at points remote from the axis of rotation. Thus, upon rotation of the element, these springs are flexed out of the plane in which they normally lie and the point of attachment, being free in space, moves inwardly thus eliminating any tendency of the pivoted element to move in a direction perpendicular to the axis of rotation.

At the same time, these springs may have the form of flat strips lying in the above referred to planes and joined edgewise or made integral. In this way, they resist vibration of the element both axially of the axis of rotation and laterally thereof.

The novel features which I believe to be characteristic of my invention are set forth with particularity in the appended claims. My invention itself, however, both as to the organization and method of operation, together with further objects and advantages thereof, may best be understood by reference to the following description taken in connection with the accompanying drawings in which—

Fig. 1 represents an embodiment of my invention;

Fig. 2 represents the suspension means of Fig. 1 on a larger scale for better illustration of certain elements thereof;

Fig. 3 is a simplified plan view with the elements in their normal position;

Fig. 4 is similar to Fig. 3, but shows the elements with the index member in a position rotated from the normal position.

Referring to Fig. 1 of the drawing, I have shown my invention as applied to an instrument having an index member 1 adapted for reciprocation over a scale 2 in accord with currents applied to a winding 3 of the actuating means 4 of the instrument. This actuating means comprises a rotor 5 mounted within a magnetic field producing means having a core 6 on which the winding 3 is arranged and which may rotate in either direction from its normal position to a desired extent dependent, for example, on the magnitude and polarity of current in winding 3. The rotor 5 has a shaft 7 which is suspended in the suspension means 8 of my invention for frictionless rotation.

The shaft 7 is suspended from the frame of the instrument which may, for example, be of any desired form but which is illustrated as comprising a pair of parallel bars 9 and 13 which are joined at their ends by members 13' and 13'' to form a rectangle. The shaft 7 extends through openings 14 and 15 in said parallel bars 9 and 13, as better shown in Fig. 2. The bar 13 is provided with flat spring members 16, 17, 18, and 19 which extend in planes radially from the element 7. Similarly, bar 9 has springs 16', 17', 18', and 19' extending radially from the element 7 and in the same planes as the springs 16, 17, 18, and 19, respectively. Between the bars 9 and 13, shaft 7 is provided with an anchor member 22 securely attached thereto and to which spring members 16'', 17'', 18'', and 19'' are attached, all of these spring members extending radially from the element 7. Each of these springs is in the same plane as a corresponding pair of the aforementioned springs; i.e., the spring 16'' is in the same plane as springs 16 and 16', etc. All of the spring members lying in a single plane are connected together at a point remote from the element 7. Thus, the spring members 16, 16', and 16'' are attached by bar 24. Similarly, the spring members 17, 17', and 17'' are attached by bar 25. Spring members 18, 18', and 18'' are attached by bar 26, and the spring members 19, 19', and 19'' are attached by bar 27. These attaching means 24, 25, 26, and 27 may be of any suitable form, or, if desired, the springs 16, 16', and 16'' in any single plane, may be made integral. For example, they may be stamped as three fingers extending from a single sheet of spring steel, bronze, or other suitable resilient material.

Fig. 2, being on a somewhat larger scale than Fig. 1, indicates the rotating element 7, which carries the index 1 of Fig. 1, as having the member 22 rigidly attached thereto while it passes through openings 14 and 15 in the respective frame members 9 and 13 without any frictional engagement therewith.

Fig. 3 is a plan view looking down upon the top of the suspension assembly with the index member 1 positioned at the center of the scale 2 and with the parts in normal position; i.e., in a position corresponding to that in which winding 3 is de-energized, for example. Since the spring members are in the same plane, only a single spring member is shown in Fig. 3 in each plane, and these spring members are given the reference characters 16', 17', 18', and 19', these being the numerals applied to the top spring member in each plane in Figs. 1 and 2.

Fig. 4 shows the index rotated clockwise to the right end of the scale so that the spring members 16'', 17'', 18'', and 19'' are flexed in the clockwise direction out of the planes of the other spring members. This flexure of all of the springs causes some deformation thereof, as shown, and tends to bias the index 1 toward the center of the scale. At the same time, since the springs are now curved rather than straight as in the normal position, the distance between a pivot and the point of attachment of the various springs is shortened causing the outer ends of the springs to move inward; and since those ends are free to move, such movement takes place. This obviates any tendency of the pivot itself to move off of its normal center position.

In the operation of the suspension as thus far described, it has been found preferable to attach all of the different connecting members 24, 25, 26, and 27 by means of a circular spring band 28. This band 28 is rigidly attached to the outer ends of all of the springs, as to the various bars 24, 25, 26, and 27, so as to divide the spring band 28 into equal segments. It has been found that by the use of such a circular spring or band 28, a greater range of movement of the index 1 is possible while maintaining the movement of all of the parts in their proper relationship and without misalignment. For example, if the ring 28 be not employed, it has been found that upon movement of the member 1 to the outer limits of its range, the bars 24, 25, 26, and 27 may tend, in some instances, to become nonparallel, thus producing some misalignment of the elements and possible inaccuracy of the movement of the index 1. This effect is reduced by the use of spring 28, and more accurate movement of index 1 over a wider range is practical.

The band 28 imposes some restraint upon the free movement of the ends of the springs in the radial direction. However, since the spring assembly is symmetrical with respect to the axis of rotation of the shaft 7, this is not objectionable since the same restraint occurs in all directions and there is no tendency to move the shaft 7 off from the normal axis of rotation. This action is illustrated in Fig. 4 in which the band 28 is illustrated as deformed from the circle 28, shown in Fig. 3, due to inward movement of the ends of the springs due to lateral flexure thereof.

The edgewise arrangement of the different springs in the planes in which they lie tends to resist vibration of member 7 both axially of itself and laterally of itself. Either type of vibration produces stress edgewise of these springs. Thus, it is desirable that these springs be flat; i.e., of greater dimension in the plane of the other springs than at right angles thereto. In that way, by proper dimensioning of the springs, any desired resistance to both these types of vibrations may be provided while at the same time avoiding any tendency to move element 7 off center.

It will, of course, be understood that various simplifications of my invention may be made in applications where all of the elements of Fig. 1 and Fig. 2 are not required to produce the suspension required in the particular application. For example, the fundamental element of my invention might be considered any pair of springs, such as springs 16' and 16", one attached to the shaft and the other to the support, and connected together at their remote ends. Such a unit alone may, in certain applications, serve adequately to support a shaft for rotation about an axis and resist movement from the axis and vibration in a single plane. Such a unit may comprise a single U-shaped piece stamped from a sheet of spring metal. It is preferable, however, to employ spring members attached to the support, both above and below the member attached to the shaft, or vice versa, since this arrangement tends to maintain the springs in the plane of the shaft during rotation of the shaft and avoid snap actions, buckling, etc. The use of such units in different radial planes is desirable to resist vibration in the respective planes. Moreover, the symmetrical arrangement of the assembly is highly desired where smooth accurate operation of the index over a wide range is desired and where maximum resistance to lateral vibration is required and in different applications dependent upon requirements, the springs may be arranged in three, four, or more planes as desired, which may be either symmetrical or non-symmetrical.

While I have shown a particular embodiment of my invention, it, of course, will be understood that I do not wish to be limited thereto since many modifications may be made without departing from the spirit and scope of my invention.

What I claim as new and desire to secure by Letters Patent of the United States is:

1. In combination, a shaft adapted for rotary movement in either direction from a normal angular position about an axis of rotation, a suspension therefor comprising planar spring members extending in a direction radially from said axis in a plurality of radial planes, a support, planar spring members extending from said support radially of said shaft, each of said last spring members lying in the same radial plane as a respective one of said flat radial spring members, said spring members in any plane being attached together at a point remote from said shaft and support, one of said spring members in each plane being attached to the shaft and the other to the support thereby to provide support for said shaft, and said spring members being adapted for flexure in the direction of and in response to rotation of said shaft and to resist flexure in directions at right angles thereto, whereby said radial members are flexed upon any rotation of said shaft from said normal position and support said shaft.

2. In a suspension for the rotary index member of an instrument, said index member being carried by a vertical shaft arranged for rotation in either direction, a plurality of elongated spring members attached to and extending radially from said vertical shaft in different radial planes, a support near said shaft, a plurality of spring members attached to said support and extending radially of said shaft from said support and in the same vertical planes as said first spring members, said spring members in any plane being attached together at a point remote from said shaft and from said support and being rigid in the vertical direction to support said shaft and flexible in the horizontal direction to flex upon rotation of said shaft from a normal position.

3. In a suspension for a rotary reciprocating shaft of an instrument, comprising spring members attached to and extending radially from said shaft in each of a plurality of radial planes, said planes intersecting in said shaft, a frame, spring members attached to and extending from said frame radially of said shaft on either side of said first spring members and in the same planes, all of said spring members in any of said radial planes being flexible in directions at right angles to said planes and rigid in said planes and being connected together at points remote from said shaft and from their respective points of attachment to said frame to support said shaft and to allow rotary reciprocation thereof.

4. In a suspension for a rotary reciprocating shaft of an instrument arranged for rotation about an axis, comprising elongated spring members attached to said shaft and extending radially from said shaft in each of a plurality of planes radiating from said axis, a frame, elongated spring members attached to and extending from said frame radially of said shaft on either side of said first spring members and in the same radial planes, all of said spring members in any radial plane being flexible out of said planes and being connected together at points remote from said shaft to support said shaft and to allow reciprocation thereof about said axis, and a spring band concentric with said shaft and rigidly connected to said remote points of attachment and flexibly connecting said points said spring band being freely movable at all other points.

5. The combination, with an index carrying shaft rotary about its longitudinal axis and having actuating means to reciprocate it about said axis from a normal angular position, of a frictionless suspension for said rotatary shaft, said suspension comprising a flat spring member attached to said shaft and extending therefrom in a plane defined by said spring member and the axis of rotation of said shaft, a support, a second flat spring member attached to said support near said shaft and extending radially outward from said shaft in the same plane as the first spring member, said flat spring members being connected together at a point remote from said shaft and from said support to support said shaft and to flex circumferentially of said shaft upon reciprocation of said shaft about said axis from said normal position.

6. The combination, with an index carrying shaft rotary about its longitudinal axis having actuating means to reciprocate it about said axis from a normal angular position, of a frictionless suspension for said rotary shaft, said suspension comprising a flat elongated spring member attached to said shaft and extending therefrom in a plane defined by said spring member and the axis of rotation of said shaft, a support, a second flat elongated spring member attached to said support near said shaft and extending outward radially of said shaft in the same plane as the first spring member, said spring members being connected together at a point remote from said shaft and from said support to support said shaft and to flex circumferentially of said shaft upon reciprocation of said shaft from said normal position, said spring members having larger dimensions in the direction longitudinal of said shaft than lateral thereof to reduce vibration of said element both longitudinally and laterally of itself.

7. The combination, with a rotary index carrying shaft of an instrument having actuating means to reciprocate it about the axis of said shaft from a normal position, of a frictionless suspension therefor, said suspension comprising a plurality of flat springs extending from said shaft in different radial planes including said axis, a support, a plurality of flat springs attached to said support near said shaft and extending radially of said shaft and outward therefrom each in a plane of a respective one of said first flat springs and said axis, said flat springs in each plane being joined at a point remote from said shaft and all of said flat springs having a dimension longitudinally of said shaft sufficiently greater than its thickness dimension to resist vibration of the shaft both longitudinally of itself and laterally in said planes.

8. In combination, a shaft adapted for rotary reciprocation about an axis from a normal position, a frictionless suspension therefor, said suspension comprising a flat spring member having one end attached to the shaft and extending in a direction radial of said axis, the major plane of the flat spring member including said axis, a support, a flat spring extending from said support away from and radially of said axis and lying in the same plane as said first spring member and in edgewise relation thereto, said spring members being attached together at a point remote from both said shaft and said support, both of said flat spring members being adapted to flex in the direction of and in response to rotation of said shaft about said axis, and said two spring members having sufficient rigidity in a direction longitudinally of said axis to resist vibration of the shaft longitudinally of said axis and to suspend said shaft from said support.

References Cited in the file of this patent

UNITED STATES PATENTS

| | | |
|---|---|---|
| 2,291,612 | Draper | Aug. 4, 1942 |
| 2,322,292 | Harrison | June 22, 1943 |
| 2,693,928 | Bishop | Nov. 9, 1954 |